April 30, 1940.  O. G. STRAUSS  2,199,033
MACHINE FOR APPLYING SEALING TAPE TO WRAPPED ARTICLES
Filed Feb. 14, 1939  7 Sheets-Sheet 1

Inventor
Ober G. Strauss
By Miller & Miller
Attorney

April 30, 1940. O. G. STRAUSS 2,199,033
MACHINE FOR APPLYING SEALING TAPE TO WRAPPED ARTICLES
Filed Feb. 14, 1939 7 Sheets-Sheet 4

Inventor
Ober G. Strauss
By Miller & Miller
Attorney

Patented Apr. 30, 1940

2,199,033

UNITED STATES PATENT OFFICE 2,199,033

MACHINE FOR APPLYING SEALING TAPE TO WRAPPED ARTICLES

Ober G. Strauss, Orlando, Fla.

Application February 14, 1939, Serial No. 256,401

14 Claims. (Cl. 216—30)

This invention relates to machines for applying sealing tape to advancing wrapped articles.

One of the objects of the invention is the provision of a machine for positioning a free end of the sealing tape in advance of the moving article and applying same thereto, combined with means operable by said pressing and applying means to positively draw off tape from a supply thereof for a succeeding tape-applying operation.

Still another object is the construction of a machine of the character indicated applicable for applying sealing tape to wrapped spherical, oblate and ovate objects, such as oranges, grapefruit, apples and objects of similar shape.

Yet a further aim is the provision of a machine as indicated adapted for sealing wrapped quandrangular objects such as cartons and the like.

Yet another purpose of the invention is the formation of a machine for applying sealing tape to advancing wrapped articles which is reliable and efficient in operation, durable and well adapted for its intended use.

The above and other aims and objects will be apparent from the detailed description hereinafter appearing when taken in conjunction with the appended drawings forming a part hereof to which reference is now made and in which:

Fig. 8 is a front elevational view showing a cooperating pair of wrapper applying cups in operative position to a fruit and also showing the initial stage of the encircling wrapper-securing strip as applied by the improved device forming the subject matter of this application.

Referring now in detail to the drawings by reference characters, and wherein like characters designate like parts in the various views and first to Figs. 1 to 8 inclusive, F designates a frame of any suitable design for supporting the various cooperating units of the device. Rotatably supported adjacent one end of the frame F is a paper strip roll R from which the strip is drawn in the operation of the device. The strip S extends continuously from the roll R, through an adhesive applying unit A, through the strip pull-off unit P and thence to the strip delivering, cutting and applying unit D. Inasmuch as the unit D functions to directly deliver the strip and apply same to the wrapped fruit it is believed best to first describe in detail the construction thereof.

Figures 1, 2:
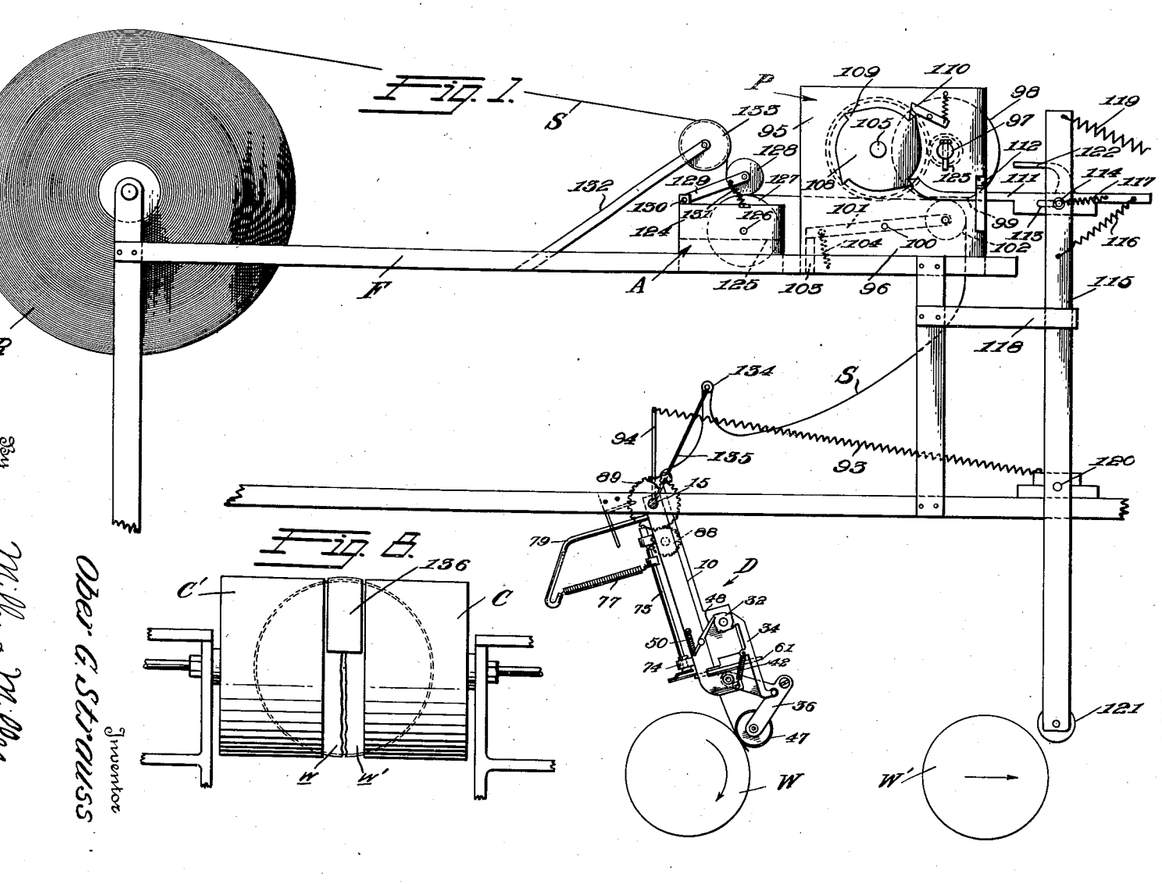
Fig. 1 is a side elevational view of the device constituting the subject matter of the instant application and comprising an adhesive-applying and pull-off unit for wrapper tape and a delivering, cutting and applying unit for the latter in their operative relation to one another.
Fig. 2 is a side elevation of the unit which delivers and cuts the tape into strips and applies same to the wrapped fruit or similar object.
Figures 2, 3:
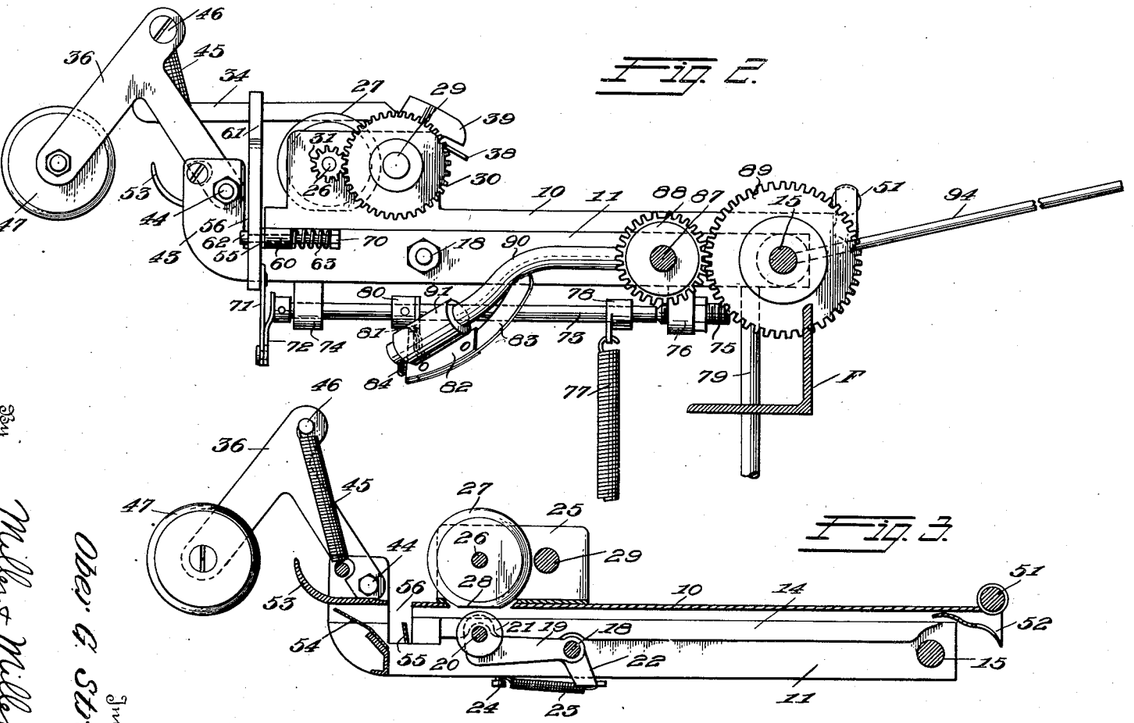
Fig. 3 is a longitudinal section in a plane substantially as represented by the line 3—3 on Fig. 6.
Figures 4, 5:
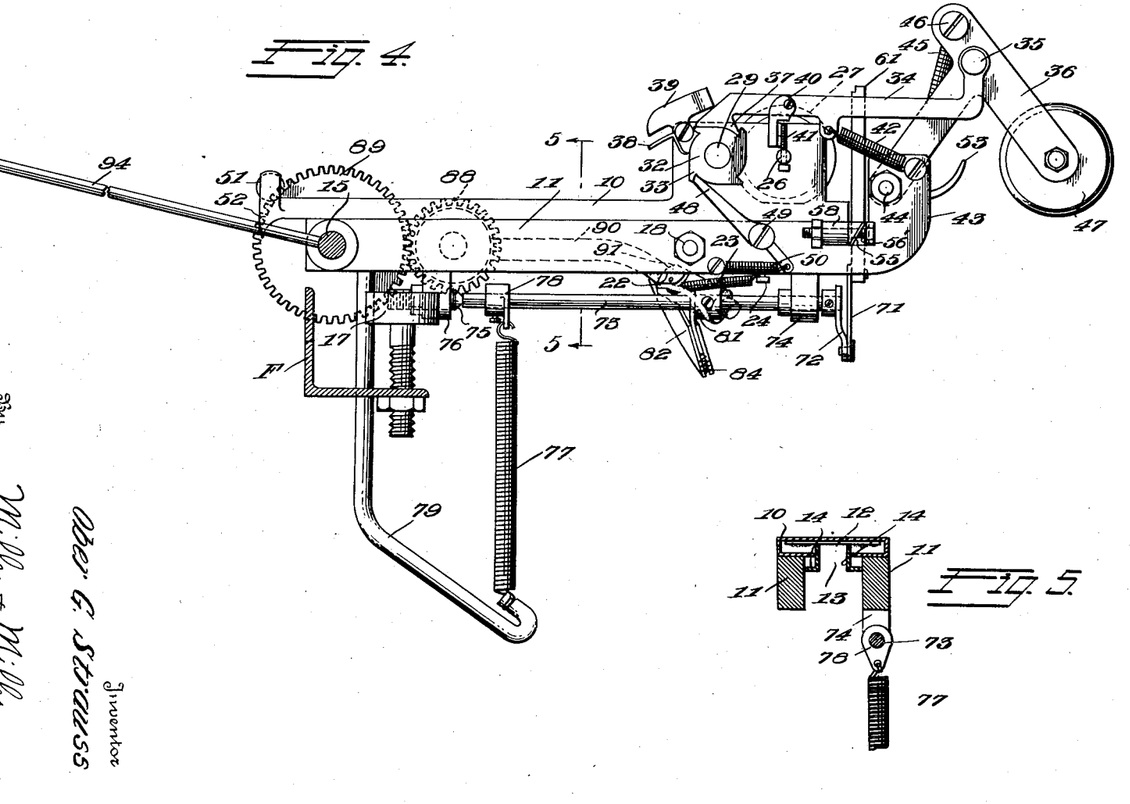
Fig. 4 is an opposite side elevation of the strip delivering, cutting and applying unit shown in Fig. 2.
Fig. 5 is a transverse section in a plane substantially as represented by the line 5—5 on Fig. 4, with certain elements omitted for the sake of clarity.

The unit D as illustrated in Figs. 2 to 6 inclusive comprises an elongated base 10 mounted upon and secured to a pair of laterally spaced bars 11 coextensive with said base. The base 10 may be formed from sheet metal and, as shown in Figs. 3 and 5, has a strip guiding channel 12 which is open centrally thereof as at 13 and said base further includes oppositely disposed ledges 14 for a purpose later described.

Figures 6, 7:
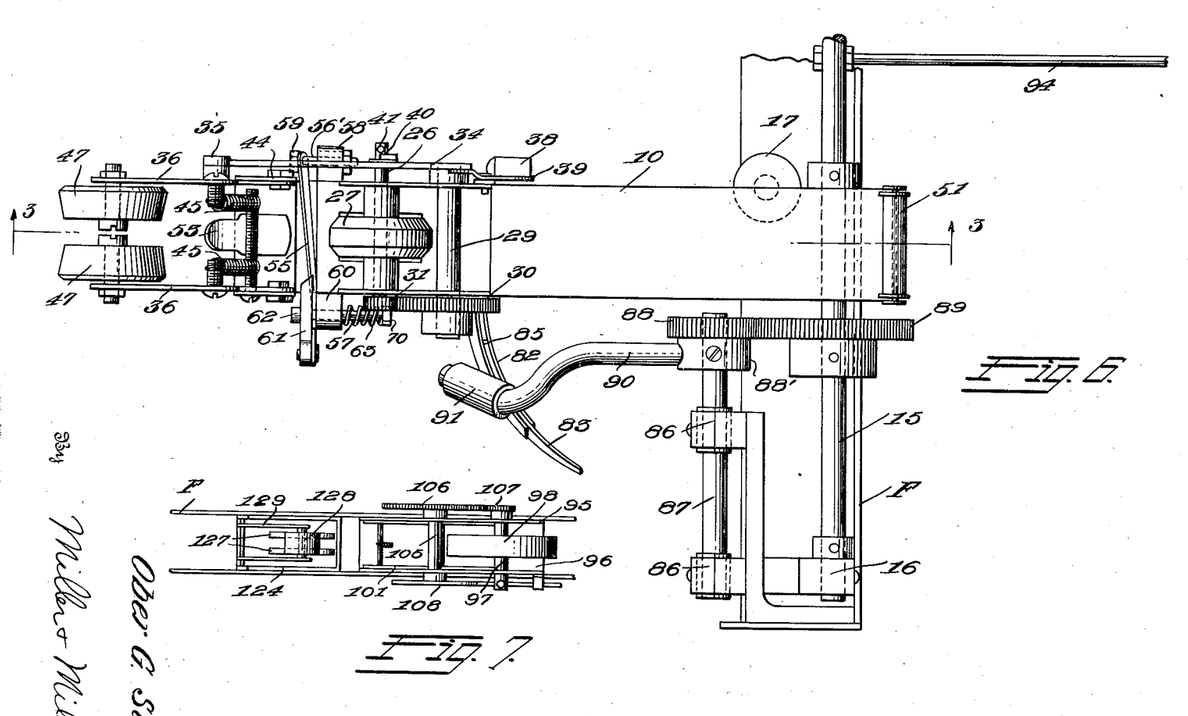
Fig. 6 is a top plan view of the strip delivering, cutting and applying unit shown in Figs. 2 and 4.
Fig. 7 is a top plan view of the adhesive applicator and strip pull-off unit shown in side elevation in Fig. 1.

The bars 11 are secured adjacent their rear ends to a shaft 15 rotatably journalled in bearings supported by the frame F, one of said bearings being indicated at 16 in Fig. 6, whereby the base 10 together with the bars 11 are capable of swinging movement in a vertical plane relative to the frame F, the base 10 being limited in its downwardly swung position by means of a stop 17 adjustably mounted in the frame as illustrated in Fig. 4.

Pivotally supported on a shaft 18 carried by the bars 11 is a roller supporting frame comprising a pair of laterally spaced arms 19 (only one of which is indicated in Fig. 3) and a shaft 20 on which is rotatably mounted a strip engaging roller 21 projecting through the opening 13 and into the strip guiding channel 12. One of the arms 19 is provided with an extension 22 to whose free end is secured one end of a spring 23, the opposite end of the spring being attached to an adjacent bar 11 as at 24. The arms 19 engage beneath the ledges 14 for limiting the upward movement of roller 21 under the action of the spring 23.

A shaft 26 is rotatably journalled in spaced extensions 25 of the base 10, said shaft having a strip feeding roller 27 secured thereto for cooperation with roller 21 upon feeding rotation of roller 27. The latter is flattened as at 28 for a purpose which will appear later.

Rotatably journalled in the extensions 25, rearwardly of shaft 26, is another shaft 29 to one end of which a relatively large gear 30 is fastened, said gear being in mesh with a smaller gear 31 secured to the adjacent end of shaft 26 whereby rotation of shaft 29 will impart feeding rotation to roller 27.

A ratchet wheel 32 having four equi-angularly spaced teeth 33 is secured to the opposite end of shaft 29. Operatively engaged with the ratchet wheel 32 is an actuating pawl 34 pivotally connected at 35 to one of a pair of laterally spaced angular arms 36. The pawl 34 normally engages the ratchet wheel 32 between two adjacent teeth thereof and, as indicated in Fig. 4, has a nose 37 for engaging the respective teeth 33 to impart clockwise rotation to the ratchet wheel 32 upon forward movement of the pawl 34.

A rest 38 for the pawl in its retracted position and an edge guide 39 are secured to the adjacent extension 25, the rest 38 being positioned for accurate engagement of the nose 37 with an adjacent tooth 33 upon forward operative movement of the pawl.

Fastened to the pawl 34 intermediate its ends is a stop member 40 for engagement with a stop pin 41 secured in shaft 26 to limit feeding rotation of the roller 27 as well as for a purpose later described. The pawl 34 is yieldingly maintained in ratchet wheel engaging position by means of a spring 42, one end of which is secured to the pawl and the other end of which is attached to one of a pair of extensions 43 on the front ends of bars 11.

The pair of angular arms 36 are pivotally mounted on the extensions 43 as indicated at 44 and one end of a spring 45 is secured to each arm as indicated at 46, the opposite ends of the spring being fastened to the extensions 43, (see Fig. 3). The springs 45 normally hold the arms in downward position as limited by the stops 40 and 41.

A wrapped-fruit engaging roller 47 is rotatably supported at the free end of each arm 36, the rollers being preferably inwardly bevelled as indicated in Fig. 6 for approximate conformation with the surface of the wrapped fruit. The ratchet wheel 32 is restrained against reverse rotation by means of a dog 48 pivoted at 49 and yieldingly urged into engagement with the respective teeth 33 by means of a spring 50, Fig. 4. The base 10 is provided with tape guide means adjacent both the entering and exit ends of channel 12 and as shown in Fig. 3 these comprise a guide roller 51 and guide plate 52 at the entering end and an upwardly curved upper guide 53 and a lower upwardly directed guide 54 cooperating with the guide 53 at the exit end.

The unit D also includes strip cutting or severing means comprising a blade 55 disposed in a transverse recess 56 adjacent the front end of base 10. The blade 55, as shown in Fig. 6, is flexible and has its opposite ends apertured for the passage therethrough of bolts 56' and 57. The bolt 56' extends thru a lug 58 and has its head 59 disposed in spaced relation to the lug for movement of the corresponding end of the blade 55 toward the lug under the action of a movable blade later described. The opposite end of the blade 55 engages the bolt 57 between a lug 60 and the movable shearing blade 61. The bolt 57 has its head 62 in engagement with blade 61 and a coil spring 63 is disposed between the lug 60 and an adjustable nut 70 for yieldingly holding the blade in shearing engagement with the laterally flexible blade 55. The movable blade 61 is connected by means of articulated links 71 and 72 to a shaft 73 which is rotatably journalled adjacent its front end in a bearing lug 74 and which at its rear end is engaged by the cone-pointed end of a screw 75 (Figs. 2 and 4) adjustable within a lug 76. The shaft 73 is yieldingly retained in a normal angular position by means of a spring 77 with the blade 61 inoperatively disposed. One end of said spring is connected to a sleeve 78 fixed to the shaft 73 and the other end of the spring is attached to the lower end of an angular rod 79 depending from an adjacent bar 11. A shaft oscillating member is fixed to the shaft 73 as at 80 and comprises a rigid extension 81 to which is pivoted the bifurcated portion 82 of a blade 83. A spring 84 is disposed adjacent the pivot to permit movement of the blade 83 toward the extension 81 and stop shoulders 85 are provided adjacent the pivot for restraining movement of the blade relative to the extension 81 in the opposite direction.

Rotatably journalled in bearings 86 on frame F is a shaft 87 to whose inner end is secured a gear 88 in mesh with a gear 89 fixed to the shaft 15. Secured to the boss 88' of the gear 88 is one end of a rod 90 whose free end is angularly disposed with relation to the body portion thereof and has rotatably mounted thereon a blade engaging roller 91.

The unit D in operative position thereof is suspended from the frame F as is more or less diagrammatically indicated in Fig. 1 with the rollers 47 disposed in the path of advance or feeding movement of the wrapped fruit W, the roller 47 being normally disposed below a plane defining the upper limits of the wrapped fruit. The unit is also yieldingly maintained in the normal position indicated in Fig. 1 by means of a coil spring 93, one end of which is secured to a rod 94 attached to the shaft 15 and the other end of which is secured to the frame F. The spring yieldably holds one of the bars 11 in engagement with the adjustable stop 17.

It is desirable and highly advantageous that the strip S be delivered to the unit D in a substantially slack condition for reasons hereinafter to appear and the strip is so delivered by the pull-off unit P which pulls the strip S from the roll R, through the adhesive applying unit A and delivers same in slack available condition for use by the unit D. The pull-off unit P, in a preferred embodiment thereof, comprises opposite walls 95 of an open-ended casing 95. A shaft 97 is rotatably journalled in the walls 95, to which shaft is secured a strip pull-off roller 98 having a flattened portion 99 normally disposed as indicated in Fig. 1 for a reason later set forth.

A frame 101 is pivotally supported at 100 between the walls 95, the forward end of said frame having a strip pressure roller 102 rotatably connected thereto which upon rotation of roller 98 engages the circular edge thereof for effecting a pull on the strip S. The frame 101 on the side of pivot 100 opposite the roller 102 is normally maintained in engagement with a stop 103 by means of a spring 104. Rotatably journalled in the walls 95 adjacent the shaft 97 is a second shaft 105 to one end of which, exteriorly of the adjacent wall 95, a relatively large gear 106 is secured, said gear being in mesh with a smaller gear 107 fixed to the corresponding end of the shaft 97.

A ratchet wheel 108 having four equi-angular spaced teeth 109 is attached to the opposite end of the shaft 105 externally of the adjacent wall 95, said teeth being successively engaged by a spring-pressed dog 110 to prevent retrograde rotation of the shaft 105. Cooperating with the ratchet wheel 108 is a pawl 111 which is longitudinally movable in a guide 112 secured to the outer face of the adjacent wall 95, said pawl 111 being provided intermediate its ends with a longitudinal slot 113 through which projects a pin 114 supported by the pawl-actuating lever 115 adjacent the upper end thereof. A spring 116 is provided to yieldingly maintain the pawl 111 against the upper wall of the guide 112 for accurate engagement with the teeth 109. The pin 114 is yieldingly held in the rear end of slot 113 by a spring 117, while a spring 119 holds the pawl-actuating lever 115 in inactive position as determined by a stop 118.

The aforementioned lever 115 is pivotally connected intermediate its ends to the frame F as is indicated at 120 and a fruit-engageable roller 121 is rotatably journalled in the lower end of the lever. Upon extreme operating movement of the pawl 111 a stop 122 carried thereby engages with a stop pin 123 on shaft 97.

The adhesive applicator A as shown is disposed closely adjacent the pull-off unit P and comprises a casing 124 adapted to contain a quantity of suitable glue or adhesive to a level suggested by the dotted line 125. The fixed casing shaft 126 rotatably journals a pair of laterally spaced rollers 127 which are partially immersed in the adhesive. Cooperating with the rollers 127 is a single roller 128 rotatably journalled in a frame 129 pivotally connected with the casing at 130, the frame being yieldably urged toward the casing by a spring 131 for holding roller 128 under yielding pressure contact with the rollers 127. An upright member 132 is mounted on the frame F and supports a strip guide roller 133 in proximity to the roller 128.

In operation, the entire mechanism for drawing the strip S from the roll R, applying the adhesive, delivering the strip into contact with the wrapped fruit and severing the successive fruit enveloping lengths of strip is brought about by contact of the wrapped fruit W and W' with the rollers 47 and 121 respectively.

As disclosed in the patent to O. G. Strauss, No. 2,090,559, issued August 17, 1937, the fruit to be wrapped is successively engaged by opposed wrappers w, w' by means of vacuum cups C and C' the fruit thus wrapped is moved forwardly or to the right in Fig. 1. When a wrapped fruit W approaches the strip delivering, cutting and applying unit D the various cooperating elements of the different units are in the position indicated in Fig. 1 with a surplus of strip S disposed between the pull-off unit P and the delivering, cutting and applying unit D, the surplus strip preferably passing over a guide roller 134 carried by a rod 135 which may be secured to the shaft 15.

As will be seen in Fig. 1, a relatively short length of strip S carrying adhesive on the margins of one face thereof, projects from the forward end of the guide channel 12 of the unit D. By contact of the fruit with the spring-pressed rollers 47 this short length of strip is firmly pressed against the edges of the opposed wrappers w, w'. Thus upon rotation of the wrapped fruit W, as in the patent above referred to, the strip is carried about the circumference of the fruit firmly uniting the edges of the opposed wrappers in the manner indicated in Fig. 8 wherein the portion 136 of the strip is substantially in the beginning stage as represented in Fig. 1.

When the wrapped fruit W moves forward and rotates the rollers 47 ride on the curved surface of the fruit and maintain the glued strip S in contact with the wrappers and the strip is freely drawn through the channel 12 of the unit D; the flattened portion 28 of the roller 27 permitting this action. Upon engagement of the rollers 47 with the wrapped fruit W, the unit D will swing like a pendulum about the axis of the shaft 15 against the resistance of the spring 93 resulting in rotation of gear 88. The rotation of the latter moves the rod 90 toward the blade 83, and when the roller 91 carried by the rod 90 engages the blade 83 the relatively strong spring 77 will be brought into action and the unit D will then swing against the combined resistances of the springs 77 and 93. The combined resistance referred to exceeds that of the springs 45 and accordingly the latter will yield upon further movement of the wrapped fruit resulting in counterclockwise motion of the arms 36 about their pivots 44, thereby moving the pawl 34 rearwardly until the ratchet wheel engaging portion thereof rests upon the seat 38. The unit D will thereafter continue to swing by contact with the forwardly moving wrapped fruit, overcoming the resistance of spring 77 and imparting rotation to shaft 73 by contact of the moving roller 91 with the cammed edge of the blade 83, whereupon the movable cutter 61 is moved outwardly relative to the adjacent bar 11 until the roller moves out of contact with the blade. When the roller 91 passes over the blade 83 the relatively strong spring 77 will quickly impart a reverse rotation to the shaft 73 and due to the momentum of the rapidly moving blade 61 it will over-run its normal position and come into rapid shearing engagement with the blade 55 and sever the strip. The length of strip S between the rollers 47 and the free severed end thereof will be applied to the wrapped fruit during the subsequent contact of the rollers with the fruit. When the center of the wrapped fruit passes beyond the centers of the rollers 47, the spring 93 will quickly return the unit D to its initial position against the stop 17 which is preferably of yieldable material to cushion the impact of the unit therewith.

Upon return of the unit to its initial position the reverse rotation of gear 88 will bring the roller 91 against the back or convex edge of the blade 83 which will yield through the action of the spring 84 and thus allow the roller 91 to pass the blade to its initial position for a subsequent cutting operation.

Finally, the springs 45 will urge the arms 36 in a clockwise direction upon release of pressure contact between the wrapped fruit and rollers 47 resulting in forward movement of the pawl 34, the nose 37 of which will engage the adjacent ratchet wheel tooth 33 and move the ratchet wheel 32 clockwise one quarter revolution, and as gears 30 and 31 are in a 4 to 1 ratio the feed roller 27 will be rotated one complete revolution which through the cooperation of the spring pressed roller 21 will feed another length of strip into the position indicated in Fig. 1 for a subsequent operation.

The fruit W' after having been stripped by the unit D moves forwardly and upon engagement with the roller 121, the lever 115 will be rocked about its pivot 120 and after being rocked a relatively short distance the pin 114 will engage the opposite end of slot 113 and move the pawl 111 to the left until stops 122 and 123 are in contact. When this occurs the ratchet wheel 108 will have been rotated one quarter of a revolution which, due to the 4 to 1 ratio between the gears 106 and 107, will impart a complete rotation to the pull-off roller 98 which in cooperation with the spring pressed roller 102 will draw a length of strip from the roll R and through the adhesive applicator A for supplying freely available strip material in advance of the unit D as indicated in Fig. 1.

After the roller 121 has completely passed over the fruit W' the spring 119 will draw lever 115 back to its normal position and the spring 117 will draw pin 114 back to the forward end of the slot 113. By the provision of two laterally spaced rollers 127, adhesive is applied only to the opposite margins of the strip S and as the roller 21 operates within the opening 13 it does not contact a glued surface. It will also be noted that ledges 14 aid in preventing contact of the glued surface with the wall of channel 12. The flat surface 28 on the roller 27 is normally in a horizontal position immediately above the roller 21 which provides free and unrestricted passage of the strip through the channel 19 upon rotation of the fruit W being wrapped. The roller 21 contacts the roller 27 only during feeding rotation of the latter.

The roller 98 in the pull-off unit P is preferably of substantially the diameter of fruit to be stripped whereby a proper amount of strip will be delivered to the unit D prior to each stripping operation thereof. However, the flat surface 99 on the roller 90 provides for free movement of the strip between the rollers 98 and 102 in the event that a larger fruit requiring more strip than is normally pulled off by the pull-off unit P is being stripped.

The modified construction of Figs. 9 to 14 inclusive is particularly adapted for taping the top and opposite ends of quadrangular packages such as boxes and comprises a frame 140 characterized by a pair of spaced parallel vertical plates 141 to whose lower ends a second pair of similar spaced parallel plates 142 are secured as by bolts 143.

The frame is supported for vertical adjustment for operative association with various sizes of boxes by means of a pair of brackets 144 fixed to the outer faces of the respective plates 141, each plate being provided with a pair of rods 145 vertically adjustable in frame members 146 which project from the base of a conveyor for feeding the boxes past the tape applying mechanism. The frame is retained in any adjusted position by thumb screws 146'.

A spindle 147 is rotatably journalled adjacent the tops of plates 141 for supporting a roll R of tape T and a spring 148 surrounds the spindle 147 between one of the plates 141 and a follower 149 to act as a brake and prevent over-running of the spindle as tape is drawn from the roll. The tape is preferably of the gummed variety and in order to render the tape sufficiently adhesive for application, a moistening box 150 is disposed between the plates 141 below the tape roll R and is suitably secured in position by set screws 151 and may be filled with water through a nozzle 150'.

Figure 9:
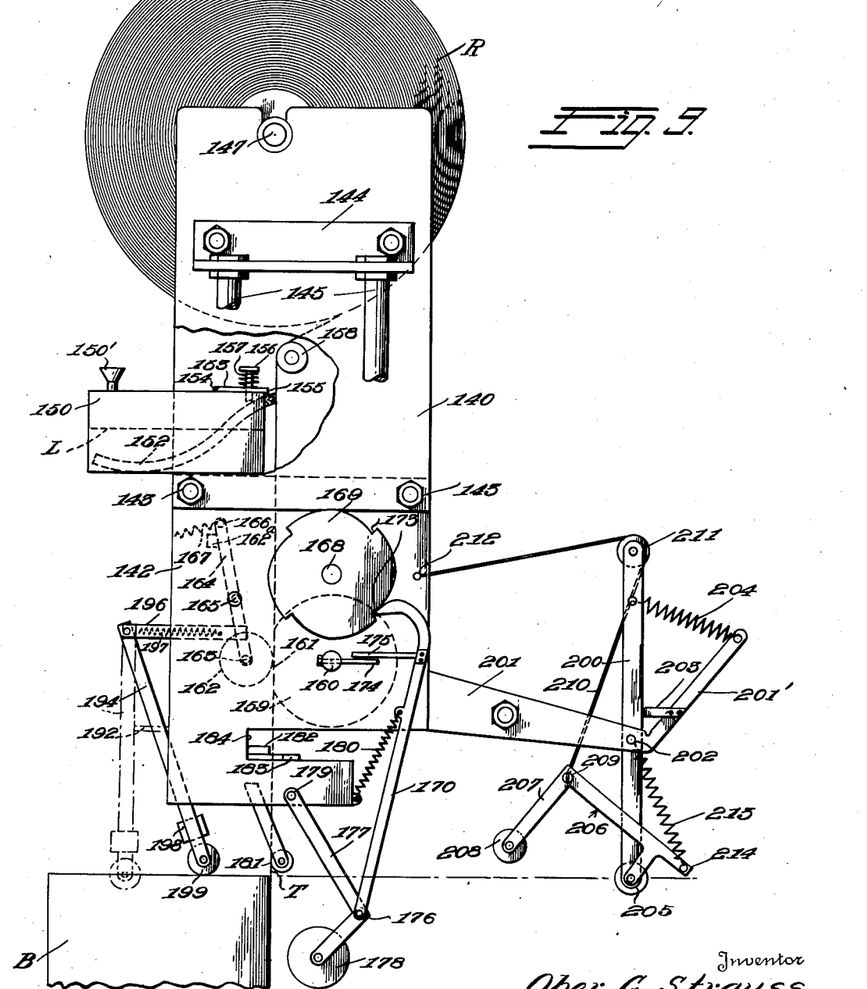
Fig. 9 is a side elevational view of a modified form of the invention.
Figure 10:
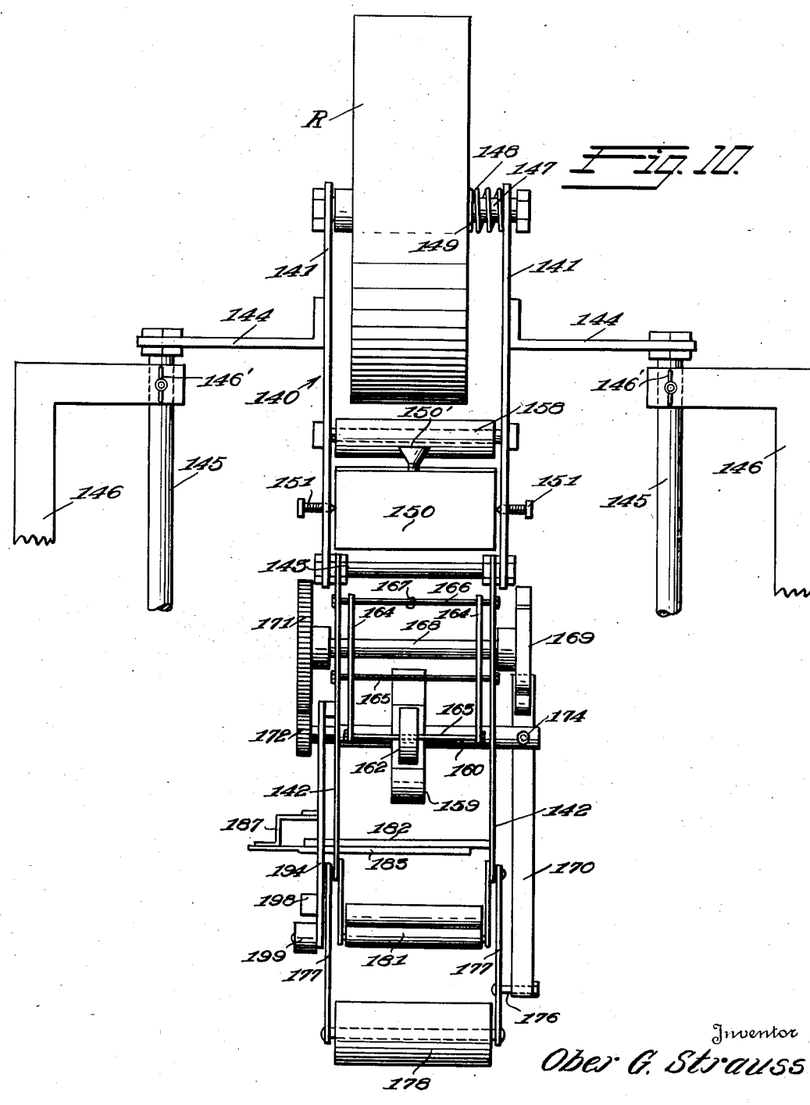
Fig. 10 is a left end elevation of the structure illustrated in Fig. 9 with certain structure omitted for sake of clearness.

A strip of felt or like absorbent material 152 is supported in the box 150 with the major portion thereof immersed in the liquid L and with the free end thereof extending through the box adjacent the top and protruding a short distance therefrom as shown in Fig. 9. Means are provided for adjustably compressing the felt strip 152 adjacent its protruding end for controlling the amount of the liquid delivered to the tape. This means comprises a plate 153 hingedly connected to the box 150 at 154 and having an angular disposed flange 155 at its free end for bearing contact with the strip 152. The aforementioned bearing contact is attained by means of a set screw 156 threaded into a suitable lug within the box and having a spring 157 disposed between the head of the screw 156 and the plate 153.

A guide roller 158 is rotatably journalled between the plates 141 in a position to accurately hold the tape in engagement with the projecting end of the moistening strip 152. As indicated in Fig. 9 the tape T extends vertically from the roller 158 to the tape applying rollers later described and means for pulling tape from the roll R is provided intermediate the moistening box 150 and the tape applying rollers. The tape pulling means comprises a roller 159 carried by a shaft 160 rotatably journalled between the plates 142, the roller 159 having a flat in its periphery at 161 for allowing tape in excess of that pulled by the roller to be drawn from the roll R.

An idler roller 162 is provided for holding the tape in engagement with the roller 159 during feeding rotation thereof. The former is rotatably journalled on a shaft 163 which is supported by side bars 164 pivotally connected intermediate their ends on a shaft 165 and being connected at their opposite ends by a rod 166 to which is secured a spring 167 for yieldably holding the roller 162 in cooperative relation with respect to roller 159. A stop 162a may be provided to limit the movement of the roller 162 toward roller 159 under the action of the spring 167.

The feed roller 159 is intermittently rotated by ratchet mechanism in the following manner.

A shaft 168 is rotatably journalled between the plates 142, said shaft having a ratchet wheel 169 fixed to one end thereof adapted to be operated by a pawl 170 in a manner later described. A relatively large gear 171 is fastened to the opposite end of shaft 168 which gear is in driving engagement with a relatively smaller gear 172 fixed to roller shaft 160. As will be noted, the ratchet wheel 169 is provided with four equally spaced teeth 173 and the gear 171 has a circumference four times that of the gear 172 whereby the feed roller 159 will make one complete rotation upon the advance of the ratchet wheel 169 a distance of one tooth by the pawl 170. The shaft 160 and pawl 170 are provided with cooperating stop pins 174 and 175 respectively. As shown the pawl 170 is pivotally connected at 176 to the swinging frame 177 of a box engaging and tape applying roller 178, the frame 177 being pivotally connected to the plates 142 at 179. A spring 180 has one end thereof connected to the pawl 170 and the opposite end thereof fastened to the frame for operatively advancing the pawl and holding roller 178 in normal position. A guide roller 181 is supported from the frame in a position to guide the depending tape into contact with the forward end of an approaching box B.

Figure 11:
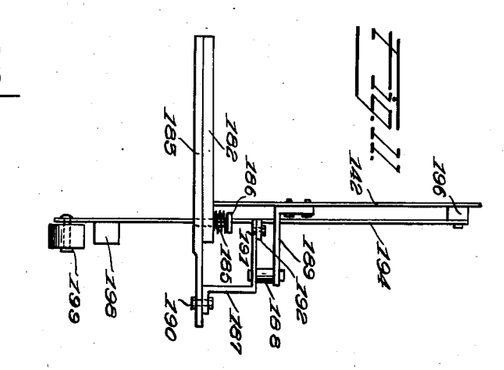
Fig. 11 is an edge elevational view of the tape cutting mechanism.
Figure 12:
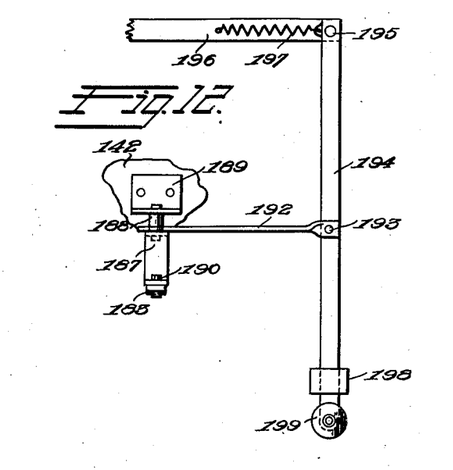
Fig. 12 is a side elevation of the tape cutting mechanism.

Tape cutting mechanism is disposed between the pull-off roller 159 and the guide roller 181 and comprises a fixed knife 182 and a movable knife 183 both arranged in a recess 184 in the frame, said knives being normally spaced apart a distance sufficient to permit the tape to be freely drawn therebetween. The knives are yieldably maintained in close shearing relation by a spring 185 disposed between the head 186 of the pivot pin for the movable knife and the fixed knife. The cutting mechanism is adapted for operation by the successive advancing boxes and is indicated in Figs. 11 and 12 a bell crank lever 187 pivotally connected at 188 to a fixed bracket 189, has one end thereof pivotally connected to the movable knife 183 at 190 and the opposite end thereof pivotally fastened at 191 to one end of a link 192. The opposite end of link 192 is pivotally connected at 193 to an operating arm 194 which in turn is pivotally connected at its upper end at 195 to a support 196. Interconnecting the arm 194 and support 196 is spring 197 which in cooperation with a weight 198 secured to the arm adjacent its lower end tend to hold the arm in normal position and also function to cause the cutting action. A roller 199 is rotatably journalled on the lower end of the arm 194 for engagement with the successive boxes for effecting the tape cutting operation in a manner hereinafter described.

A frame-like lever comprising spaced parallel arms 200 is pivotally connected to a bracket 201 as at 202. The lever 200 is held in normal position against a stop 203, Fig. 9, by a relatively heavy spring 204 which is secured at one end thereof to extensions 201' of the bracket 201 and at its opposite end to the member 200. A roller 205 is rotatably journalled between the lower ends of arms 200 and a frame 206 having opposed parallel angular arms 207 is pivotally connected to the shaft of roller 205 and rotatably supports a roller 208 between the free ends of the arms 207. The latter are of substantially right angular form, and secured to a shaft 209 at the apices of such arms is one end of a cable 210 which extends about a pulley 211 rotatably journalled between the upper ends of arms 200 and which has its opposite end secured between the frame plates 142 as designated by the numeral 212. A spring 213 which is relatively lighter than spring 204 has one end thereof fixed to a shaft 209 and its opposite end secured to extensions of the frame 206 as at 214. It will be seen that spring 213 urges the frame 206 counter-clockwise and maintains the cable 210 taut and that the heavier spring 204 normally holds the lever frame 200 against the stop 203. As will be observed from Fig. 9 the cutter roller 199 (shown in dot and dash lines) and roller 205 normally have their axes in the plane of the tops of the boxes B and the roller 178 normally lies materially below such plane at a distance substantially equal to that attained by the roller 208 in a final taping operation as will be observed in Fig. 13.

In the operation of the modified device, boxes or like quadrangular packages are successively advanced to the device by any suitable form of conveyor and a length of tape T always hangs vertically before the guide roller 181 for engagement by the advancing end of each box, the tape extending downward a desired distance on the ends of the boxes. As a box B moves forward its front wall engages the cutter roller 199 thereby swinging the arm 194 about its pivot 195 and with the roller 199 riding on the top of the box. This movement of arm 194 actuates lever 187 through link 192 and moves the knife 183 a substantial distance away from the fixed knife 182. No cutting action will take place, however, as long as roller 199 is riding on top of the box.

The forward end of the moving box contacts the tape T protruding below the guide roller 181 and immediately thereafter this end will engage the tape presser roller 178 while the cutter roller 199 is still riding on top of the box. The roller 178 upon engaging the end of the box will press the end of the tape thereto and the roller will ride up the end of the box as the box progresses forwardly with tape now being drawn directly from the roll R as permitted by the flat side 161 of the pull-off roller 159. The roller 178 after moving upwardly along the forward end of the box in pressing the tape thereto against the action of spring 180 will ride along the top of the box to press the tape in position. Upon upward movement of the roller 178 the pawl 170 will also be moved upward into position for later advancing the ratchet wheel 169. While the tape pressing roller 178 is still riding on top of the box the cutter roller 199 will pass off the top whereupon the joint action of spring 197 and weight 198 will cause the arm 194 to swing substantially beyond its normal position resulting in a quick and accurate shearing action between the knives 182 and 183 to sever the tape. The spring 197 and weight 198 will then cause the arm 194 to assume its normal vertical position. This tape cutting action takes place at the time that the length of tape severed will suffice for completing the taping of the box.

Figures 13, 14:
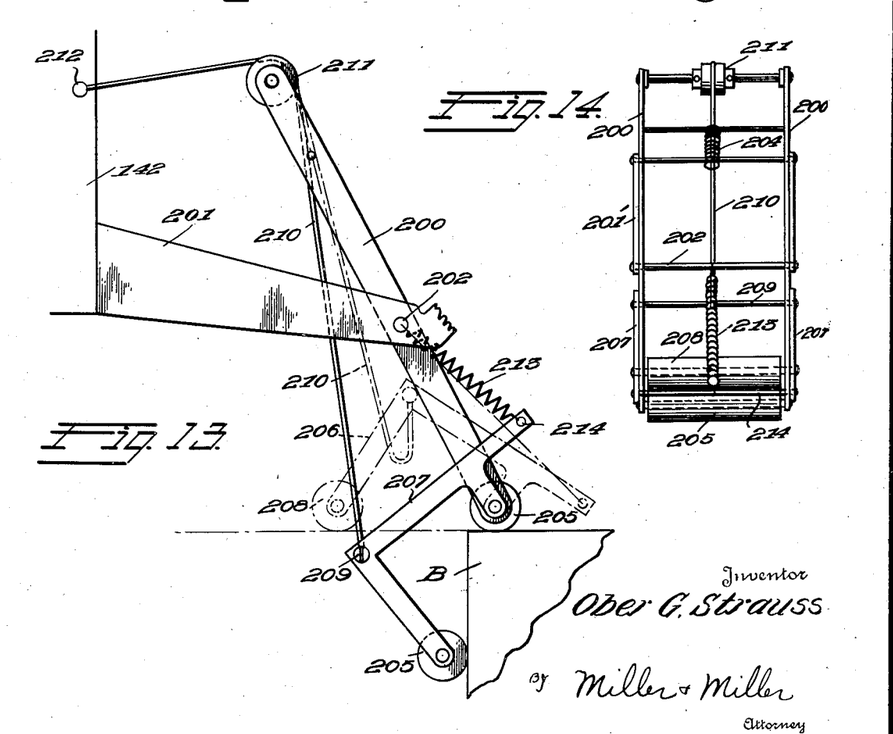
Fig. 13 is a side elevational view of the means for applying tape to the rear ends of packages to be taped, showing such means in operative position in taping a package.
Fig. 14 is an end elevation of the means disclosed in Fig. 13 in normal position as indicated at the right in Fig. 9.

Just prior to the time the roller 178 passes off the top of the box, the front end thereof will engage the roller 205 and swing the frame 200 to the position shown in full lines in Fig. 13 against the action of spring 204 resulting in substantial slack in the cable 210 as indicated in dot and dash lines, and spring 213 will move frame 206 to bring roller 208 into engagement with the top of the box, which movement however, will not take up all the slack in the cable. Upon further forward movement of the box the roller 178 will ride off the top thereof and be returned to normal position by the spring 180 which will also urge the pawl 170 downward and impart a quarter rotation to the ratchet wheel 169 and a complete rotation to the pull-off roller 159 which will advance a length of tape in vertical protruding relation to the next advancing box. On continued advance of the box, roller 208 will ride off the top thereof and by action of spring 213 will ride down the end thereof as permitted by the slack tape to press the final length of tape in position. Further advance of the box will result in roller 205 riding off the top thereof whereupon spring 204 will overcome the weaker spring 213 and return the frame 200 to its normal position as indicated in Fig. 9.

While the invention has been described in some detail, it will be understood that various changes and modifications will occur to those skilled in the art and it is contemplated to cover all such and to be limited in this respect only as may be necessary by the scope of the claims hereto appended.

What I claim and desire to secure by Letters Patent is:

1. In a machine for applying sealing tape to an advancing wrapped article, means for positioning a free end of the sealing tape in advance of the article, means for pressing said free end to an advancing portion of the article and applying same thereto, and means operable by said pressing and applying means to positively draw off tape from a supply thereof for a succeeding tape-applying operation.

2. In a machine for applying sealing tape to an advancing wrapped article, means for positioning a free end of the sealing tape in advance of the article, means for pressing said free end to an advancing portion of the article and applying same thereto, and means operable by said pressing and applying means to positively draw off tape from a supply thereof for a succeeding tape-applying operation, said last mentioned means comprising a roller, and pawl and ratchet mechanism for intermittently rotating same.

3. In a machine for applying sealing tape to an advancing wrapped article, means for applying a free end of said tape to an advancing article, means operable by the advancing article for cutting the tape, and means thereafter operable by the advancing article for drawing a length of tape from a supply thereof.

4. In a machine for applying sealing tape to an advancing wrapped article, a swingably mounted unit, said unit including tape-positioning and applying means, tape-severing means, and tape-advancing means, all of said means being operable by the swinging movement of said unit.

5. In a machine for applying sealing tape to an advancing wrapped article, a swingably mounted unit, said unit including tape-positioning and applying means, and means operable by said tape-positioning and applying means for advancing a length of tape for a succeeding tape-applying operation.

6. In a machine for applying sealing tape to an advancing wrapped article, a swingably mounted unit, said unit including tape-positioning and applying means, and means operable upon swinging movement of said unit for severing the tape.

7. In a machine for applying sealing tape to an advancing wrapped article, a swingably mounted unit, said unit including tape-positioning and applying means, means operable by said tape-positioning and applying means for advancing a length of tape for succeeding tape-applying operation, and means operable upon swinging movement of said unit for severing the tape.

8. A machine for applying sealing tape to advancing wrapped articles comprising a tape supply means, a swingably mounted tape feeding and applying unit, and a tape advancing means intermediate the swingably mounted unit and the tape supply means.

9. The structure of claim 8, and said swingably mounted unit including tape severing means.

10. A machine of the character described, comprising a swingably mounted unit, said unit including tape-feeding and applying means, tape severing means and tape advancing means, and means for supplying tape in slack condition to said swingably mounted unit.

11. A machine for applying sealing tape to advancing wrapped articles, a swingably mounted unit adapted to be engaged by said articles to swing same, said unit including tape feeding and applying means, tape severing means and tape advancing means, and means subsequently engageable by the advancing article for supplying tape in slack condition to said swingably mounted unit.

12. In a machine for applying sealing tape to advancing wrapped articles, a swingably mounted unit having a roller engageable with an advancing article, said roller having a pawl movable thereby, a ratchet-carrying feed roller operable by said pawl, tape severing means carried by said unit, the latter being adapted to be swung forwardly by an advancing article, said tape severing means being operable during said forward swinging movement, and said feed roller being operable upon rearward swinging movement of said unit upon passing of said advancing article.

13. In a machine for applying sealing tape to advancing wrapped articles, a swingably mounted roller adapted to engage and apply a free end of the tape to an advancing article, a pawl pivotally connected to said roller, a ratchet-carrying feed roller operable by said pawl, a tape severing mechanism comprising fixed and movable blades, a second swingably mounted roller engageable by said advancing article, and means operable by said second roller for actuating said movable blade.

14. A machine for applying sealing tape to advancing wrapped articles, a tape supply, means for applying adhesive to the edges of one surface of the tape, a swingably mounted unit, said unit including tape-positioning and applying means, tape-severing means and tape-advancing means, and means for feeding the adhesively-coated tape to said unit from said supply upon advancing movement of said articles.

OBER G. STRAUSS.